United States Patent
Wise et al.

(10) Patent No.: US 9,202,221 B2
(45) Date of Patent: Dec. 1, 2015

(54) CONTENT RECOMMENDATIONS BASED ON BROWSING INFORMATION

(75) Inventors: Angela S. Wise, Seattle, WA (US); Samarth S. Pai, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/204,835

(22) Filed: Sep. 5, 2008

(65) Prior Publication Data

US 2010/0064040 A1    Mar. 11, 2010

(51) Int. Cl.
G06Q 30/02    (2012.01)
H04L 29/08    (2006.01)
H04W 12/02    (2009.01)
H04W 8/16    (2009.01)

(52) U.S. Cl.
CPC ............... *G06Q 30/02* (2013.01); *H04L 67/22* (2013.01); *H04W 8/16* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 5,600,364 A * | 2/1997 | Hendricks et al. | 725/9 |
| 6,237,022 B1 * | 5/2001 | Bruck et al. | 709/201 |
| 6,421,717 B1 * | 7/2002 | Kloba et al. | 709/219 |
| 6,477,575 B1 | 11/2002 | Koeppel et al. | |
| 6,567,797 B1 | 5/2003 | Schuetze et al. | |
| 6,615,238 B1 * | 9/2003 | Melet et al. | 709/203 |
| 6,721,784 B1 * | 4/2004 | Leonard et al. | 709/206 |
| 6,853,982 B2 | 2/2005 | Smith et al. | |
| 6,904,408 B1 | 6/2005 | McCarthy et al. | |
| 6,912,505 B2 | 6/2005 | Linden et al. | |
| 6,941,321 B2 | 9/2005 | Schuetze et al. | |
| 7,058,643 B2 * | 6/2006 | Vailaya | 707/101 |
| 7,158,986 B1 | 1/2007 | Oliver et al. | |

(Continued)

FOREIGN PATENT DOCUMENTS

| | | |
|---|---|---|
| JP | 2001-306611 A | 11/2001 |
| JP | 2002-024700 A | 1/2002 |

(Continued)

OTHER PUBLICATIONS

Meteren, et al.,"Using Content-Based Filtering for Recommendation", Retrieved at<< http://www.ics.forth.gr/~potamias/mlnia/paper_6.pdf >>, pp. 10.

(Continued)

*Primary Examiner* — Dung B Huynh
(74) *Attorney, Agent, or Firm* — Louise Bowman; Danielle Johnston-Holmes; Micky Minhas

(57) ABSTRACT

Architecture for dynamically tracking information about a first-time or inactive user to a website and expeditiously presenting targeted content back to the user to maintain the user interest in the website. A visceral connection is created with the user based on immediately relevant content and functionality, and without requiring user-entered profile information about the user. Based on a few pieces of browsing information collected while at the website an action-oriented initial scenario is provided that is interesting to the user, and gets the user invested in the content (e.g., product) as a whole. Services can be recommended to users in the context of a social application or an online service provider, for example. The architecture also facilitates the up-selling, cross-selling of services, features, and products, for example, to users based on the current user browsing activity.

20 Claims, 9 Drawing Sheets

(56) References Cited

U.S. PATENT DOCUMENTS

| | | | |
|---|---|---|---|
| 7,330,890 B1 | 2/2008 | Partovi et al. | |
| 7,533,063 B2* | 5/2009 | Kianian | 705/64 |
| 7,680,819 B1* | 3/2010 | Mellmer et al. | 707/783 |
| 7,693,841 B1* | 4/2010 | Tesler et al. | 707/999.01 |
| 7,698,170 B1* | 4/2010 | Darr et al. | 705/26.35 |
| 7,779,103 B1* | 8/2010 | Fikes et al. | 709/223 |
| 7,917,402 B2* | 3/2011 | Rolf et al. | 705/26.1 |
| 2002/0019828 A1* | 2/2002 | Mortl | 707/200 |
| 2002/0059369 A1* | 5/2002 | Kern et al. | 709/203 |
| 2002/0077897 A1* | 6/2002 | Zellner et al. | 705/14 |
| 2002/0133500 A1* | 9/2002 | Arlein et al. | 707/102 |
| 2002/0138286 A1* | 9/2002 | Engstrom | 705/1 |
| 2002/0194139 A1* | 12/2002 | Kianian | 705/65 |
| 2002/0194358 A1* | 12/2002 | D'Aviera | 709/232 |
| 2003/0005134 A1* | 1/2003 | Martin et al. | 709/229 |
| 2003/0101341 A1* | 5/2003 | Kettler et al. | 713/162 |
| 2003/0106058 A1* | 6/2003 | Zimmerman et al. | 725/46 |
| 2003/0219710 A1* | 11/2003 | Suiter et al. | 434/350 |
| 2004/0010546 A1* | 1/2004 | Klug et al. | 709/203 |
| 2004/0024636 A1* | 2/2004 | Jaffe et al. | 705/14 |
| 2004/0044677 A1 | 3/2004 | Huper-Graff et al. | |
| 2004/0148347 A1* | 7/2004 | Appelman et al. | 709/204 |
| 2004/0210661 A1* | 10/2004 | Thompson | 709/228 |
| 2005/0021397 A1 | 1/2005 | Cui et al. | |
| 2005/0021420 A1 | 1/2005 | Michelitsch et al. | |
| 2005/0022006 A1* | 1/2005 | Bass et al. | 713/201 |
| 2005/0197906 A1* | 9/2005 | Kindig et al. | 705/15 |
| 2005/0216823 A1 | 9/2005 | Petersen et al. | |
| 2005/0228775 A1* | 10/2005 | Nilsen et al. | 707/2 |
| 2006/0085286 A1* | 4/2006 | Lutnick et al. | 705/26 |
| 2006/0106681 A1* | 5/2006 | Shafron et al. | 705/26 |
| 2006/0129451 A1* | 6/2006 | Kohanim et al. | 705/14 |
| 2006/0224524 A1* | 10/2006 | Keeble et al. | 705/69 |
| 2006/0224693 A1* | 10/2006 | Gaidemak et al. | 709/217 |
| 2006/0287106 A1* | 12/2006 | Jensen | 463/42 |
| 2007/0005743 A1 | 1/2007 | Herzog | |
| 2007/0094150 A1* | 4/2007 | Yuen et al. | 705/64 |
| 2007/0118603 A1* | 5/2007 | Washburn et al. | 709/206 |
| 2007/0130015 A1* | 6/2007 | Starr et al. | 705/14 |
| 2007/0204308 A1* | 8/2007 | Nicholas et al. | 725/46 |
| 2007/0204329 A1* | 8/2007 | Peckover | 726/3 |
| 2007/0214272 A1* | 9/2007 | Isaacson | 709/229 |
| 2007/0216535 A1* | 9/2007 | Carrino | 340/573.1 |
| 2007/0220010 A1* | 9/2007 | Ertugrul | 707/10 |
| 2007/0226125 A1* | 9/2007 | Temte et al. | 705/35 |
| 2007/0244749 A1* | 10/2007 | Speiser et al. | 705/14 |
| 2007/0265870 A1* | 11/2007 | Song et al. | 705/1 |
| 2007/0271518 A1* | 11/2007 | Tischer et al. | 715/744 |
| 2008/0028435 A1* | 1/2008 | Strickland et al. | 726/1 |
| 2008/0040216 A1* | 2/2008 | Dellovo | 705/14 |
| 2008/0077619 A1* | 3/2008 | Gilley et al. | 707/104.1 |
| 2008/0077953 A1* | 3/2008 | Fernandez et al. | 725/32 |
| 2008/0097850 A1* | 4/2008 | Kristal et al. | 705/14 |
| 2008/0133336 A1* | 6/2008 | Altman et al. | 705/10 |
| 2008/0167992 A1* | 7/2008 | Kokernak et al. | 705/51 |
| 2008/0189408 A1* | 8/2008 | Cancel et al. | 709/224 |
| 2008/0201413 A1* | 8/2008 | Sullivan et al. | 709/203 |
| 2008/0201643 A1* | 8/2008 | Nagaitis et al. | 715/738 |
| 2008/0201733 A1* | 8/2008 | Ertugrul et al. | 725/32 |
| 2008/0222283 A1* | 9/2008 | Ertugrul et al. | 709/224 |
| 2008/0228537 A1* | 9/2008 | Monfried et al. | 705/7 |
| 2008/0263625 A1* | 10/2008 | Gomez et al. | 726/1 |
| 2008/0306816 A1* | 12/2008 | Matthys et al. | 705/14 |
| 2009/0024712 A1* | 1/2009 | Weiss et al. | 709/207 |
| 2009/0048977 A1* | 2/2009 | Aggarwal et al. | 705/50 |
| 2009/0075738 A1* | 3/2009 | Pearce | 463/42 |
| 2009/0099995 A1* | 4/2009 | Tzeng | 706/50 |
| 2009/0132559 A1* | 5/2009 | Chamberlain et al. | 707/100 |
| 2009/0138335 A1* | 5/2009 | Lieberman | 705/10 |
| 2009/0187939 A1* | 7/2009 | Lajoie | 725/34 |
| 2009/0249440 A1* | 10/2009 | Platt et al. | 726/1 |
| 2012/0022930 A1* | 1/2012 | Brouhard | 705/14.22 |

FOREIGN PATENT DOCUMENTS

| | | |
|---|---|---|
| JP | 2003-006224 A | 1/2003 |
| JP | 2005-216289 A | 8/2005 |
| RU | 2323472 C2 | 4/2008 |
| WO | 00/57335 | 9/2000 |
| WO | 2005067295 A1 | 7/2005 |
| WO | 2006064877 A1 | 6/2006 |
| WO | 2007148817 A1 | 12/2007 |
| WO | 2008026252 A1 | 3/2008 |
| WO | 2008062445 A2 | 5/2008 |

OTHER PUBLICATIONS

Chen, et al.,"Content Recommendation System Based on Private Dynamic User Profile", Proceedings of the Sixth International Conference on Machine Learning and Cybernetics, Hong Kong, Aug. 19-22, 2007, pp. 2112-2118.

Yang, et al.,"A Web Recommendation Method Based on User Interest Model", Proceedings of the Fifth International Conference on Machine Learning and Cybernetics, Dalian, Aug. 13-16, 2006, pp. 4536-4539.

International Search Report, mailed Mar. 30, 2010, 8 pages.

Notice of Allowance Issued in Chinese Patent Application No. 200980135835.5, Mailed Date: Jan. 14, 2014, Filed Date: Aug. 11, 2009, 4 Pages.

Office Action Received for Russian Federation Patent Application No. 2011108549, Mailed Date: Sep. 9, 2013, Filed Date: Aug. 11, 2009, 10 Pages.

Notice of Rejection Received for Japanese Patent Application No. 2011-526083, Mailed Date: Aug. 23, 2013, Filed Date: Aug. 11, 2009, 10 Pages.

Kamba, et al., "Personalization Technology: Information as You Like It", In Journal—Institute of Electronics Information And Communication Engineers, vol. 82, Issue 4, Apr. 25, 1999, pp. 354-359.

Saitoh, Kunihiro, "Web Personalized Tool: Optimizing Website According to User's Preferences" In Nikkei Internet Technology, Issue 35, May 22, 2000, pp. 176-183.

European search report for application No. 09811924.1 mailed Dec. 27, 2011, 5 pages.

Notice of Final Rejection Received in Japan Patent Application No. 2011-526083, Mail Date: Aug. 1, 2014, 4 pages.

Notice of Allowance Issued for Russian Patent Application No. 2011108549, Mailed Date: Sep. 12, 2014, 8 Pages. (no English translation).

* cited by examiner

CONTENT RECOMMENDATIONS BASED ON BROWSING INFORMATION

BACKGROUND

Vendors expend large amounts of money and resources in an attempt to not only draw users to a website, but to keep those users at the website using content and various content presentation techniques. A large segment of this process is based on knowing or obtaining some information about the user. For site subscribers, it is easy to populate an accessible virtual location such as a registered subscriber web page (e.g., a "member page") with interesting content for an active user about which information is known. Moreover, publically available information about the user may be obtainable for retrieval, processing, analysis, and finally, the further tailoring of content to such users. However, this can be limited in that most vendors protect subscriber information and block unauthorized access to resources such as FaceBook™ and MySpace™, for example, and other social networks that could be mined for valuable user information.

The ability to capture user attention is a desirable model in many respects. This is especially useful in the context of business and can work for non-business purposes (e.g., individual) as well. If the website stores pieces of information such as the business name and zip code of the user (or user employer) then it may be possible to find a significant amount of online information about the user and then to tailor content to be presented to the user based on that information. For example, if it is known that the user business is Joe's Rugs in Seattle, Wash., then it is likely that the business category, specific address, and phone number can be searched and obtained. This information can then be used to target the user with content related to rugs, materials, availability, delivery, discounts, etc., and in different media formats for an initial and potentially captivating experience.

However, public information may only be available for a small percentage of users, thereby limiting the ability to create a rich, dynamic, and personalized initial experience for users that do not have available information online.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a technique for dynamically tracking information about a first-time user and/or inactive user to a website and expeditiously presenting targeted content back to the user to capture and maintain the user interest. The architecture creates a visceral connection with the user based on the immediate generation of relevant content and functionality, based on limited knowledge about the user. By collecting a few pieces of information related to initial browsing activity at the website, for example, an action-oriented initial scenario can be provided that is likely to be interesting to the user, and draws the user into additional activity in the website content (e.g., product) as a whole. Content such as services, products, features, and other information can be recommended to the first-time or inactive users in the context of a social application or an online service provider, for example.

Moreover, the user experience level can be extrapolated from the browsing behavior at the website and more focused content in the form of services and/or products, for example, communicated (e.g., sends messages, recommendations) to the user based on that information. The architecture also facilitates the up-selling and cross-selling of services and features, for example, to users based on the user browsing activity at the website.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
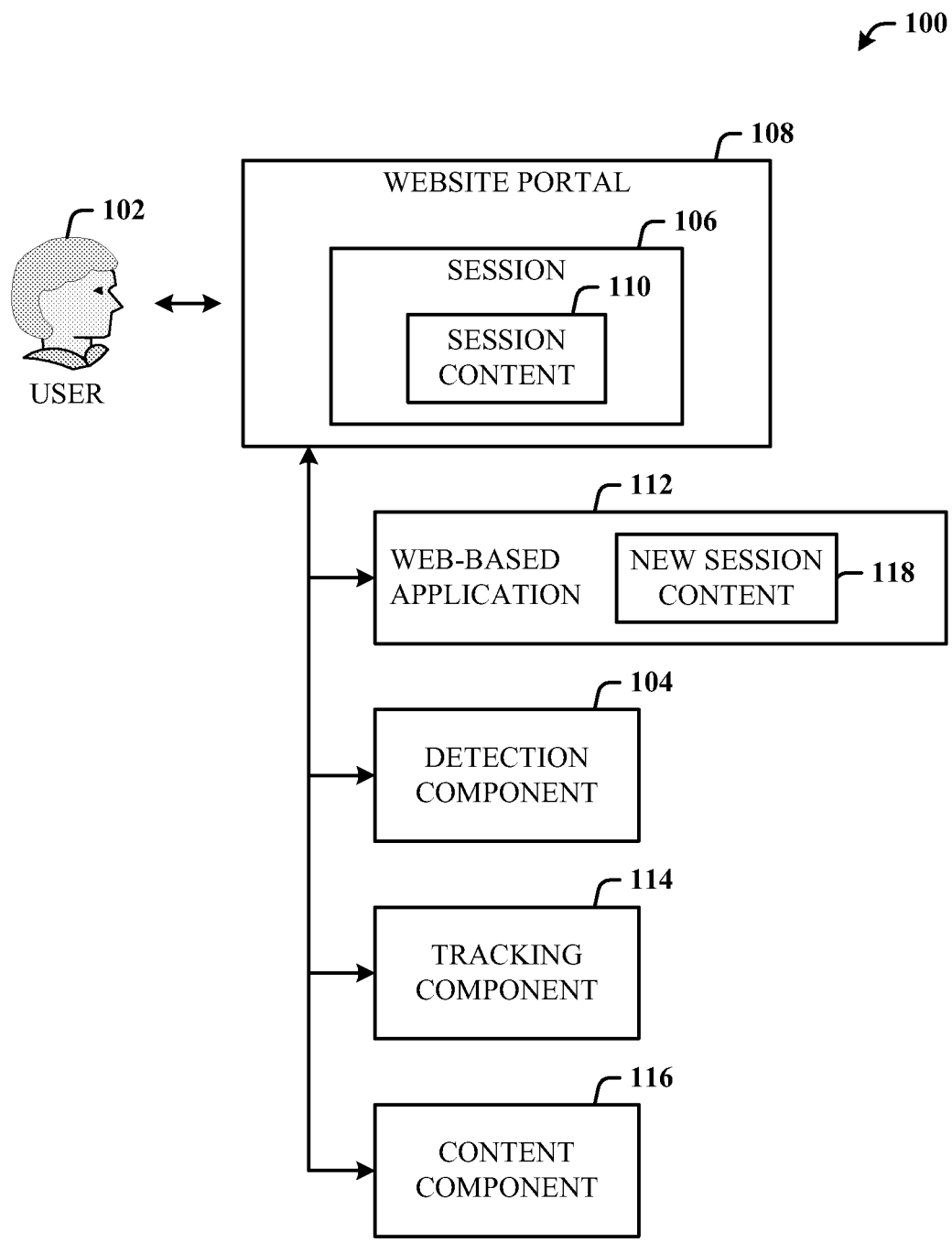
FIG. 1 illustrates a computer-implemented system that facilitates the obtainment and presentation of relevant content to an inactive or first-time user.

The disclosed architecture is a mechanism that quickly develops and provides a rich, dynamic, and personalized initial (or return) website experience for first-time (or inactive) users about which, in one aspect, the website has limited information (the first-time user) or more information (for a returning inactive user). Known subscribers are registered users about which some information is known (e.g., by way of a user profile, prior browsing activity, etc.), but have become inactive.

For example, in the context of business services, a first-time user accesses a business website that presents content in the form of a short video clip that describes one or more of the available products, features, and services. The architecture immediately begins tracking the user interaction (and lack thereof) with the content. This activity is tracked particularly in response to user browsing activity of the business services with targeted content automatically created and presented based on that activity to maintain user interest.

The activity tracked can include origin of the user (previous website from where the user linked-in to this business website), what media (e.g., videos) was watched, the feature descriptions read, and after signup of a service the first link the user (now a subscriber) selected, and so on. Thus, in the context of an inactive subscriber, this browsing information can be used to tailor a rich user experience with a goal of turning the inactive user into an active user by emphasizing topics the user may like, recommending community topics, discussions, or documents stored online, etc. In other words, the architecture provides the ability to optimize the user experience based on a small amount of information obtained about the user in a short period of time by tailoring content to the user interests as quickly as possible.

The architecture provides value in the longterm in that a detailed history of the user browsing behavior on the website can be collected. Based on this history, a business, for example, can up-sell and/or cross-sell services that are most relevant to the user. Whether in a business or non-business context, the user experience level can also be extrapolated by tracking how often the user selects Help, for example, and other menu categories, and tailoring the content as well as the media format of the content (e.g., messaging) to the user experience level. In one instance, value is provided by quickly developing and presenting "getting started" recommendations to the new (or inactive) user to convert the user into an active user.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented system 100 that facilitates the obtainment and presentation of relevant content to user 102 (e.g., an inactive user (or subscriber) or a first-time user). The system 100 includes a detection component 104 for detecting whether the user 102 is a first-time user or an inactive subscriber in a session 106 of a website portal 108. The session 106 can be a single-user experience where the user 102 (first-time or inactive) accesses a web page of the website, or the inactive subscriber logs-in to the portal 108 and is directed to a member web page that presents session content 110 as part of the session 106.

The term "media" is intended to include the format(s) of text, audio, images, animation, video, and/or interactivity forms, to name a few, where the content such as features of an application (e.g., a web-based portal application 112) and services of the application, for example, can be presented in one or more of these media formats. Note that the term "web-based" also includes network-based portals such as can be utilized in corporate enterprise environments, rather than only Internet-based websites. Accordingly, the session content 110 can include products (related or unrelated to the web-based application 112), features (e.g., web page creation) related to the web-based application 112 associated with the web portal 108, and services (e.g., messaging) provided by the web-based application 112. In other words, the website portal 108 can be an application that is part of the overall web-based application 112 and surfaced for login purposes so that a subscriber can thereafter enter the session 106 and be exposed to the session content 110. For the first-time user, the portal 108 can include an introductory web page, for example, that includes content describing the portal 108, benefits obtained by subscribing thereto, and so on, information intended to entice the first-time user to become an active subscriber or perhaps an active non-subscriber.

The system 100 can also include a tracking component 114 for tracking interaction of the user 102 with the session content 110, and a content component 116 for obtaining and presenting new content 118 (e.g., in a same or different media format) targeted to the user 102 during the session 106 based on the tracked interaction (e.g., browsing behavior) of the user 102 with all or portions of the original session content 110. The new content 118 can be solely related to features and/or services of the web-based application 112, and/or include unrelated session information such as links to other websites that provide similar content that suites the needs of the user 102.

Put another way, the website portal 108 facilitates access to the web-based application 112, which can be an entertainment application via which subscribers interact with the content to obtain entertainment information such as sports information, dining information, and other types of social information, and the session content 110 includes related entertainment application content and related entertainment application features. This also applies to social networks that include social applications that facilitate user-user interaction and the presentation of personal information and preferences, for example. The website portal 108 can also or alternatively facilitate access to the web-based application 112, which can be a business application, and the session content 110 includes related business application content such as business application features and services. For example, the content component 116 can surface step-by-step instructions or partial instructions for interacting with a business service based on interaction (browsing) behavior of the user 102 with the session content 110. If the user 102 interacts to access a Help module, this can be an indication that the user 102 not only may be interested in the service presented as part of the session content 110, but also desires assistance in learning about the service or feature.

The content component 116 can also suggest the session content 110 or new session content 118 that is popular with other first-time users, repeat users, or subscribers of the website portal 108. This can further be based at least in part on the location from which of the user 102 originated or recently linked from.

In order to intelligently recommend content to first-time users or inactive subscribers, the browsing behavior in the session 106 is tracked and services/features/help, etc., are dynamically tailored accordingly. This paradigm applies in at least some of the following contexts: the initial experience of a first-time user with a feature, where little or no information is known about the user; the subsequent experience of a user who has taken a few actions and performed a small amount of customization; and, the subsequent experience of a user who has taken many actions.

In the case of first experience, the user's browsing activity can be leveraged to make this first experience relevant and interesting, without requiring the user to complete tedious forms, or forcing the user through "getting started" wizards. Following are a few different example scenarios.

In a entertainment example, a user accesses a music event publically posted on a shared workspace (of a web-based application) via a search engine. The user wants to track some of the documents in this workspace, and decides to sign up for the business application web portal. When the user successfully signs up, it is known that the user started at the music event workspace. In response, the application automatically populates the user's initial experience with content and functionality popular with the other music event workspace subscribers and/or related to the genre of music, for example.

In a business example, the user 102 accesses a business portal and views demonstration videos of business application features and functionality. A teaser description of the more popular services can also be presented. The portal piques the user's curiosity and the user responds by viewing a video describing the business website creation tool, and other the features (e.g., a virtual service). When the user finally decides to sign up, this initial browsing activity can be used to pre-populate the business portal member web page for this user with a focus on getting started with the website and virtual tools.

Subsequent experiences of the now subscriber can build upon the information obtained from the subscriber's browsing activity while in the member page and/or other areas of the application. If the subscriber did not appear to view any information on the portal, the user may choose to look at content about the features once signed in. In this scenario, the system can combine browsing behavior with user activity.

For example, if the user navigates to the website feature multiple times, but does not edit or update the website, it can be assumed that the user is having trouble getting started with the website feature. In response, step-by-step "getting started" instructions can be dynamically surfaced for viewing and interaction. Additionally, if the user navigates to an e-mail marketing feature, for example, and then never navigates there again, it can be assumed that the user is not interested in such information, and any recommendations associated with e-mail marketing can be removed for that specific user.

In a case of subsequent experience and high customization, the user browsing activity can provide useful pieces of information about the user. For example, how often the user accesses Help, which articles the user views, and the type of media selected can be tracked to determine a level of technical sophistication. Based on that level, the user can be messaged in different ways. For example, it can be determined to surface the first few steps for setting up a new feature to the less savvy user, and only surface a link to the savvy user. In a workspace web-based application, if the user is very collaborative, social networking features can be surfaced, whereas if the user is more business oriented, a resume publishing feature can be surfaced.

The user can also click on services after subscribing to a business web portal application and experience dynamically analyzed and generated content as to recommendations (suggestions) in the member page, but only after selecting (interacting with) the session content.

Figure 2:
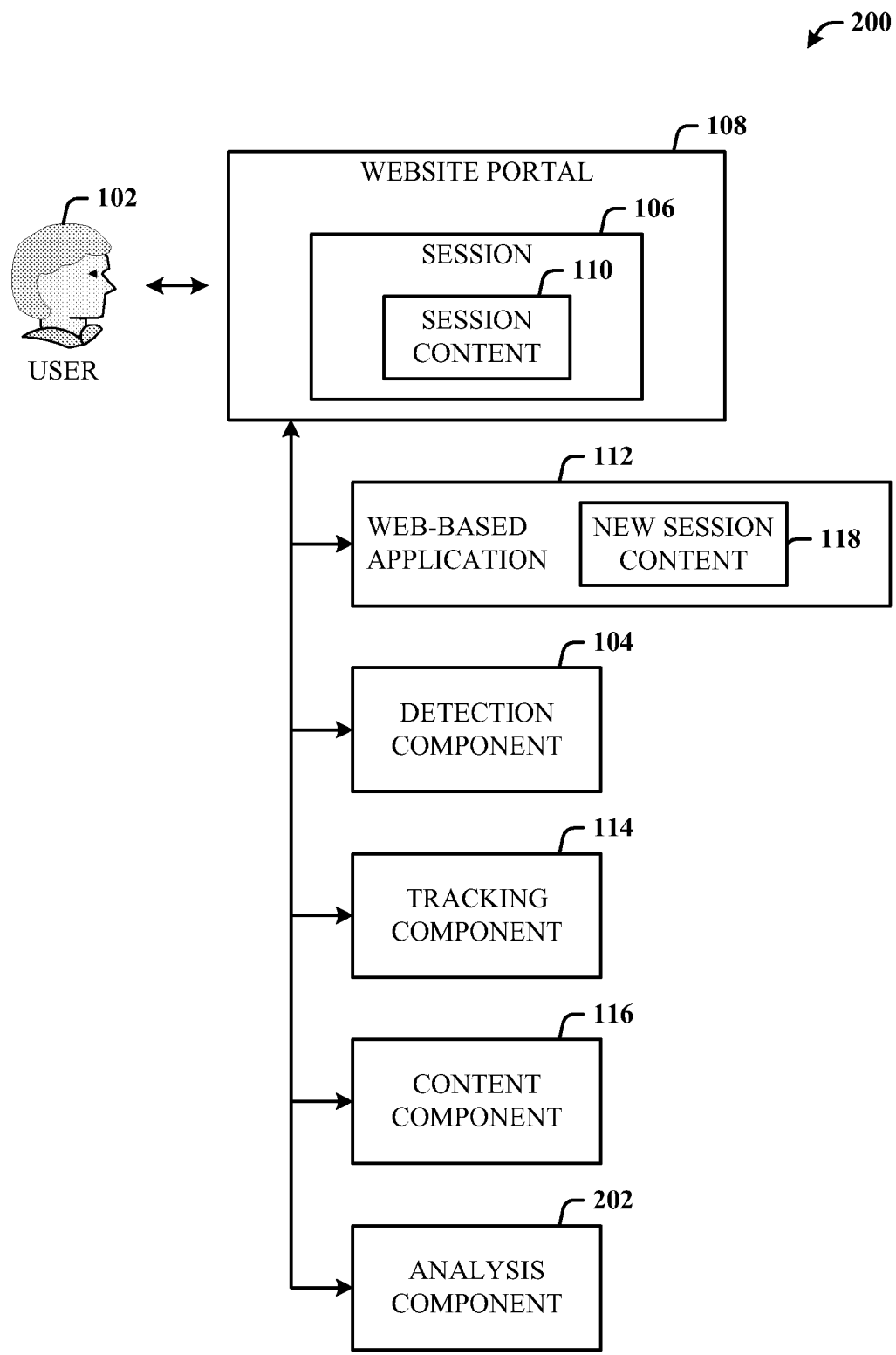
FIG. 2 illustrates an alternative system that includes an analysis component for analyzing subscriber behavior.

FIG. 2 illustrates an alternative system 200 that includes an analysis component 202 for analyzing user behavior. The system 200 includes the detection component 104 for detecting that the user 102 is an inactive subscriber in the session 106 of the website portal 108, the initial web page that presents the session content 110 as part of the session 106, the web-based portal application 112 and features related to the web-based application 112 associated with the web portal 108, and services provided by the web-based application 112. The system 200 also includes the tracking component 114 for tracking browsing behavior while in the session 106 and the content component 116 for obtaining and presenting the new content 118 targeted to the user 102 during the session 106 based on the tracked interaction of the user 102 with all or portions of the original session content 110.

The system 200 can further include the analysis component 202 for analyzing user behavior (e.g., browsing), extrapolating user experience level based on the analysis, and suggesting content in the session content 110. The content component 116 then formats and submits the content as the session content 110 based on the subscriber experience level.

Figure 3:
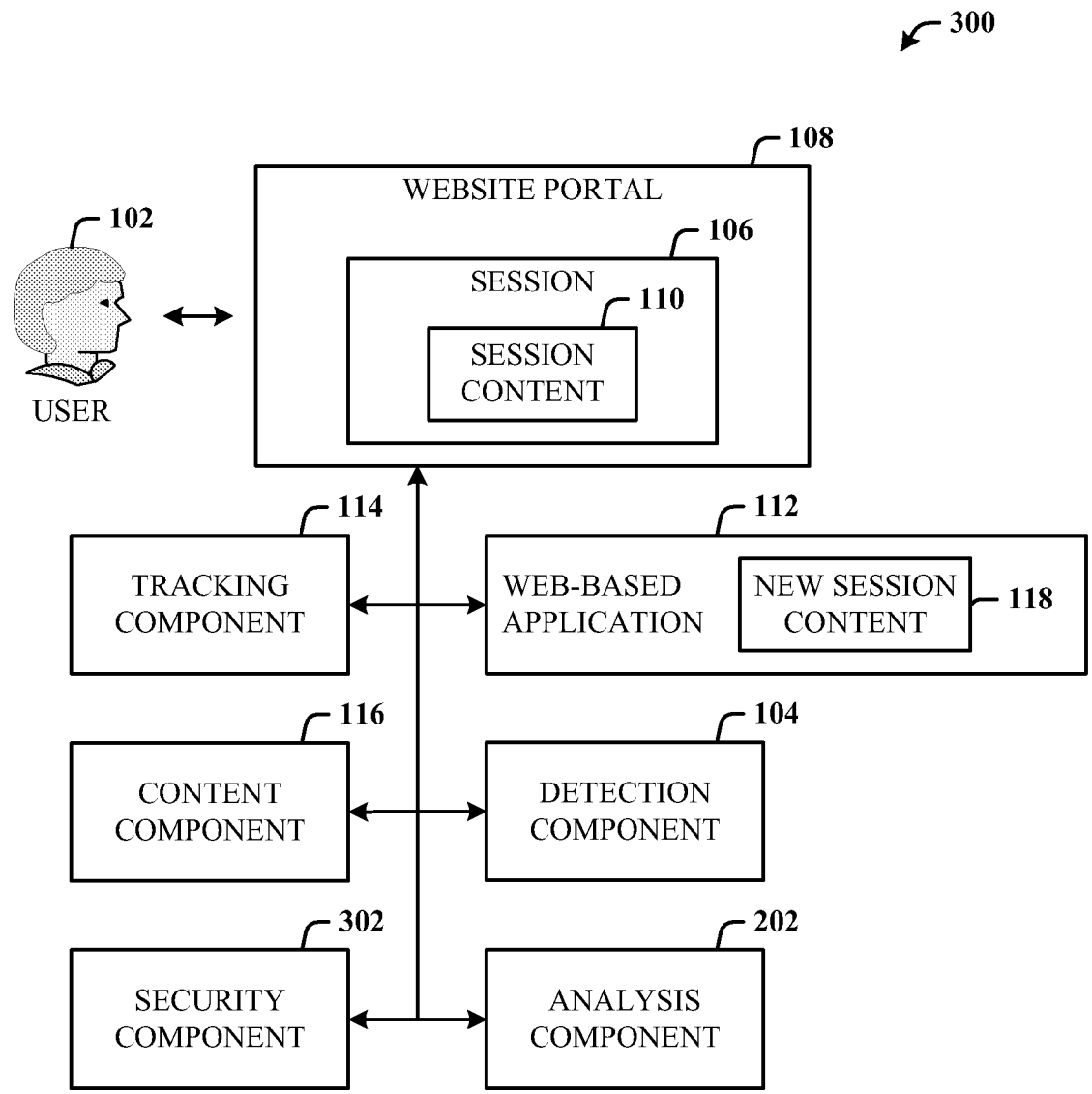
FIG. 3 illustrates a system that further employs a security component for authorized and secure handling of user information.

FIG. 3 illustrates a system 300 that further employs a security component 302 for authorized and secure handling of user information. The security component 302 allows the user 102 to opt-in and opt-out of tracking information as well as personal information that may have been obtained at signup and utilized thereafter. The user 102 can be provided with notice of the collection of personal information, for example, and the opportunity to provide or deny consent to do so. Consent can take several forms. Opt-in consent imposes on the user 102 to take an affirmative action before the data is collected. Alternatively, opt-out consent imposes on the user 102 to take an affirmative action to prevent the collection of data before that data is collected. This is similar to implied consent in that by doing nothing, the user 102 allows the data collection after having been adequately informed.

Where other applications of the security component 302 can be employed, consider the following example, where a dialog box is presented as to notice and consent for a "phishing filter" application that collects website information from the user 102 and compares this information against a database of suspected phishing websites. Any matches in the database are then sent back to the phishing filter. The dialog box provides notice that personal data will be collected as part of the phishing filter, gives a value proposition for using the phishing filter ("make your browser more secure"), asks for consent to opt-in to the data collection, includes an explanation on what the data will be used for, and also includes a prominent link to a vendor privacy policy statement.

The security component 302 also allows the user 102 to access and update profile information after subscribing. For example, the subscriber can view the personal and/or tracking data that has been collected, and provide corrections. Where sensitive personal information such as health and financial information can be tracked and obtained during subscription or thereafter, the security component 302 ensures that the data is housed using security measures appropriate for the sensitivity of the data. Moreover, vendor access to such information can be restricted using the security component 302 to control access only to authorized viewers.

The security component 302 ensures the proper collection, storage, and access to the subscriber information while allowing for the dynamic selection and presentation of the content (e.g., features, products, and/or services) that assist the user to obtain the benefits of a richer user experience and to access to more relevant information.

In other words, the computer-implemented system 200 comprises the detection component 104 for detecting the inactive subscriber 102 in a member page (the session) of the website portal 108. The member page can present center media that includes a service, for example. The system 200 further includes the tracking component 114 for tracking subscriber behavior relative to the center media and the service, the analysis component 202 for analyzing the subscriber behavior and extrapolating subscriber experience level based on the analysis, and the media component 116 for suggesting and presenting new center media targeted to the inactive subscriber based on the subscriber experience level. The website portal 108 facilitates access to a web-based social application (e.g., the web-based application 112) and, the center media includes related social application content and related social application features.

The website portal 108 also facilitates access to a web-based business application (the web-based application 112) and, the center media includes related business application content and related business application features. The media component 116 presents partial or full step-by-step instructions of a feature based on the subscriber experience level. The media component 116 can suggest center media popular with other subscribers of the website portal 108 based at least in part on an origin (e.g., a source from which the subscriber linked-in) of the inactive subscriber 102. The analysis component 202 analyzes subscriber browsing behavior prior to access to the website portal 108 and the media component 116 suggests and presents the new center media (the new session media 118) based on the prior subscriber browsing behavior and the subscriber behavior relative to the center media and the service.

Figure 4:
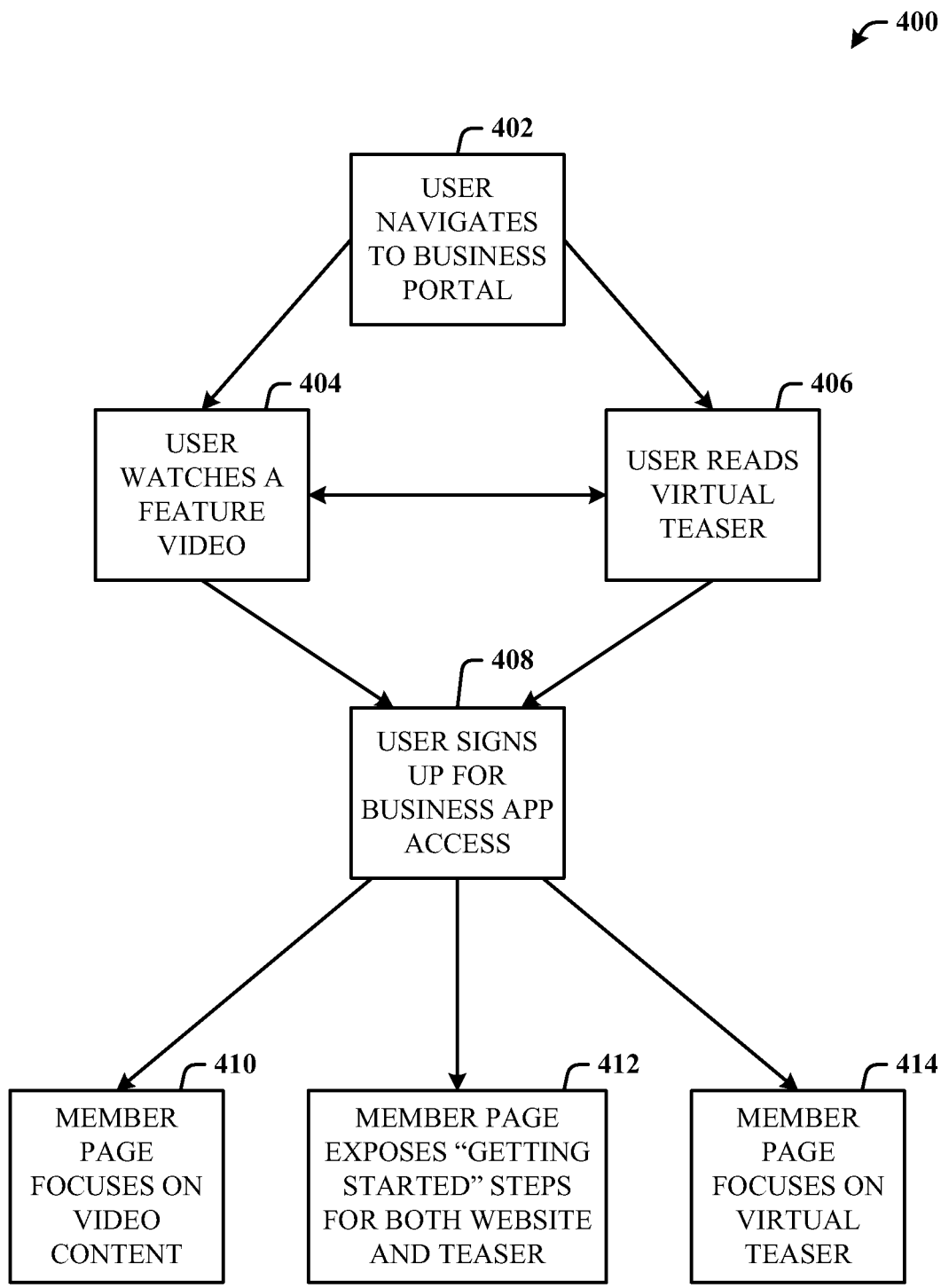
FIG. 4 illustrates a flow diagram for an exemplary business embodiment where the user selects services and receives dynamically generated suggestions in response thereto.

FIG. 4 illustrates a flow diagram 400 for an exemplary business embodiment where the user selects services/features and receives dynamically generated suggestions in response thereto. Here, the user may not be an inactive subscriber, but a first-time user to the business portal. At 402, the user navigates to a business portal presented and controlled by a business application. From 402, the user can perceive one or both of the following. At 404, without user subscription (also referred to as login or registration), the portal presents a video of a feature (e.g., website creation) of the business application (e.g., creating a web page, creating a business website, etc.). Alternatively, flow can be to 406, where the user is presented with virtual teaser information the purpose of which is to entice the user to further interact with the presented content (e.g., the feature, a service, etc.). As illustrated, flow can be from the feature video at 404 to the virtual teaser at 406, or vice versa, depending on how the use interacted with the content.

From 404 and/or 406, flow is to 408 where the user signs up (or subscribes) to access the business application. From 408, flow can be to 410 where now in a member page the subscriber is presented with information that focuses on the feature presented in the video (at 404) such as website creation, for example. This occurs dynamically after the user signs up, since it is known that the user interacted with the feature video. Alternatively, flow is to 412 where the member page exposes one or more steps to getting started for the website creation and the teaser information. This is in response to the user watching the video (at 404) and then interacting to read the virtual teaser (at 406), this interaction tracked and analyzed prior to signup (at 408). Alternatively, flow is to 414 where the subscriber is presented with additional teaser information, in response to tracking of the user interaction with the teaser information before subscribing (at 408).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 5:
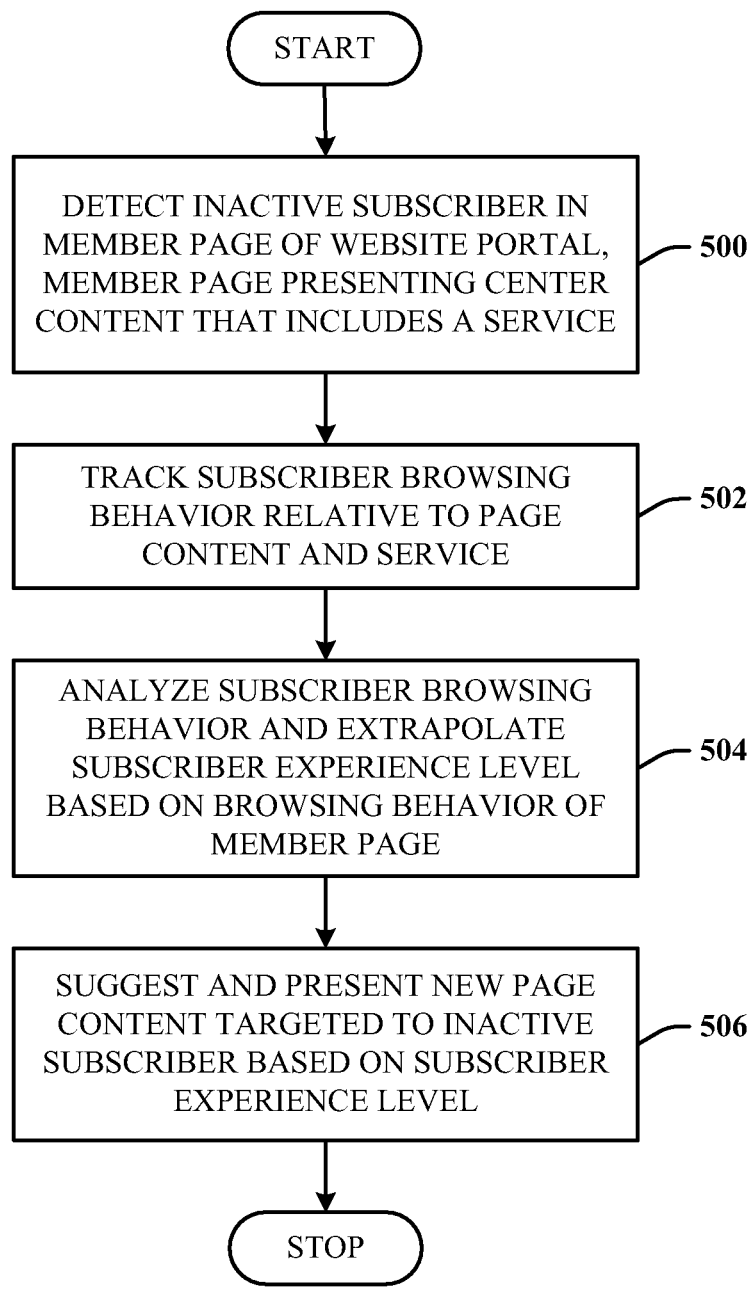
FIG. 5 illustrates a computer-implemented method of making suggestions to a user in accordance with the disclosed architecture.

FIG. 5 illustrates a computer-implemented method of making suggestions to a user in accordance with the disclosed architecture. At 500, an inactive subscriber in a member page of a website portal is detected. The member page presents center media that includes a service. At 502, subscriber browsing behavior is tracked relative to the page content and the service. At 504, the subscriber browsing behavior is analyzed and subscriber experience level extrapolated based on the browsing behavior in the member page. At 506, new page content is suggested and presented that is targeted to the inactive subscriber based on the subscriber experience level.

As previously indicated, the member page can be associated with a web-based business application, and the page content includes a service provided by the business application with which the inactive subscriber is unfamiliar, or the member page is associated with a web-based entertainment application, and the page content includes a service provided by the entertainment application with which the inactive subscriber is unfamiliar.

The method can further comprise detecting the inactive subscriber based on no prior browsing knowledge of the subscriber and dynamically changing the web page content based on a computed increase in experience with an existing service by the inactive subscriber.

The method can further comprise up-selling and cross-selling features, services, and/or products to the subscriber based on the browsing activity. The method can further comprise analyzing the browsing behavior based on duration of exposure to pieces of the content and click-through data.

Figure 6:
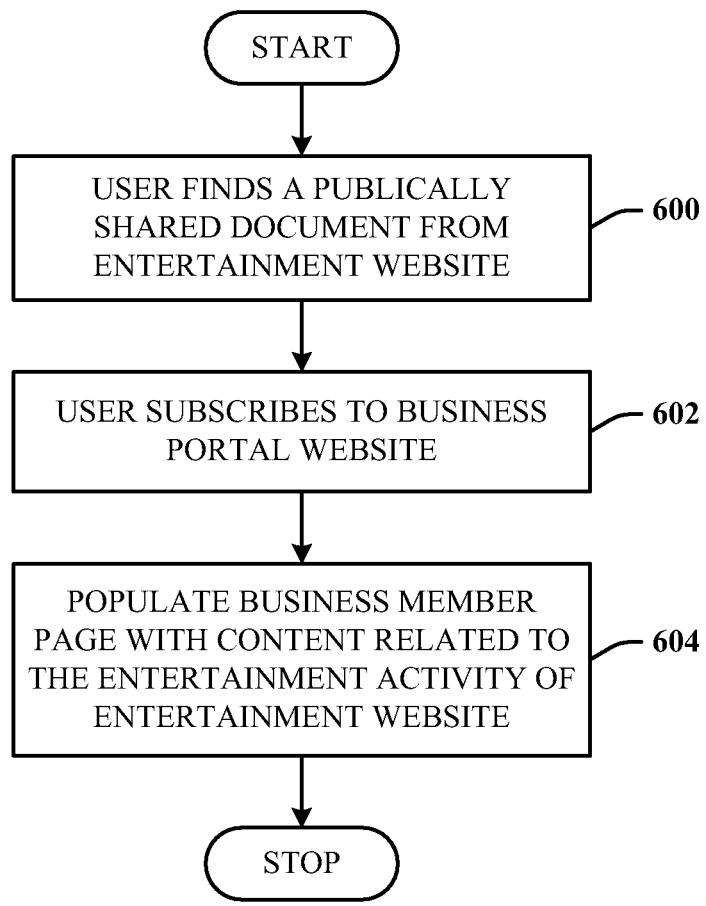
FIG. 6 illustrates a method of making recommendations to a subscriber in an entertainment environment in accordance with the disclosed architecture.

FIG. 6 illustrates a method of making recommendations to a subscriber in an entertainment environment in accordance with the disclosed architecture. At 600, a user finds a publically shared document from an entertainment website. At 602, the user subscribes to a business portal website. At 604, the business website member page is populated with content related to the entertainment activity of the entertainment website from which the subscriber originated. This is an entertainment example where the user navigates to a web-based workspace application by finding a document of interest. Since this document was interesting to the user the application takes advantage of knowing the user's interests (even without asking the user questions, or knowing any personal data).

Figure 7:
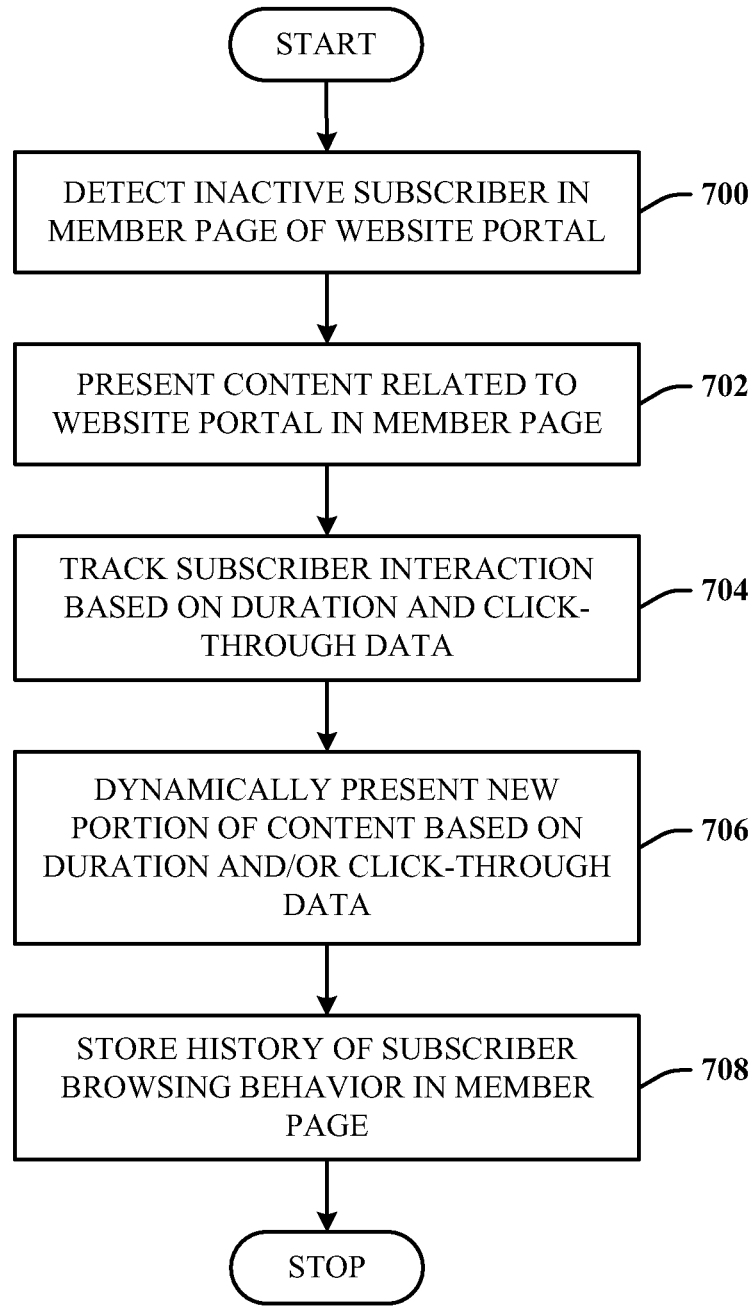
FIG. 7 illustrates a method of tracking and storing interaction data based on duration and click-through browsing activity.

FIG. 7 illustrates a method of tracking and storing interaction data based on duration and click-through browsing activity. At 700, an inactive subscriber is detected in a member page of a website portal. At 702, content is presented in the member page related to the purpose of the website portal. At 704, subscriber interaction is tracked based on duration and/or click-through data related to the content. In other words, if the subscriber does not interact with a particular piece of content within a certain time duration, it can be assumed the subscriber is not interested in the content. At 706, a new portion of the content is dynamically presented based on the duration and/or click-through data. At 708, a history of the subscriber browsing behavior in the member page is stored.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
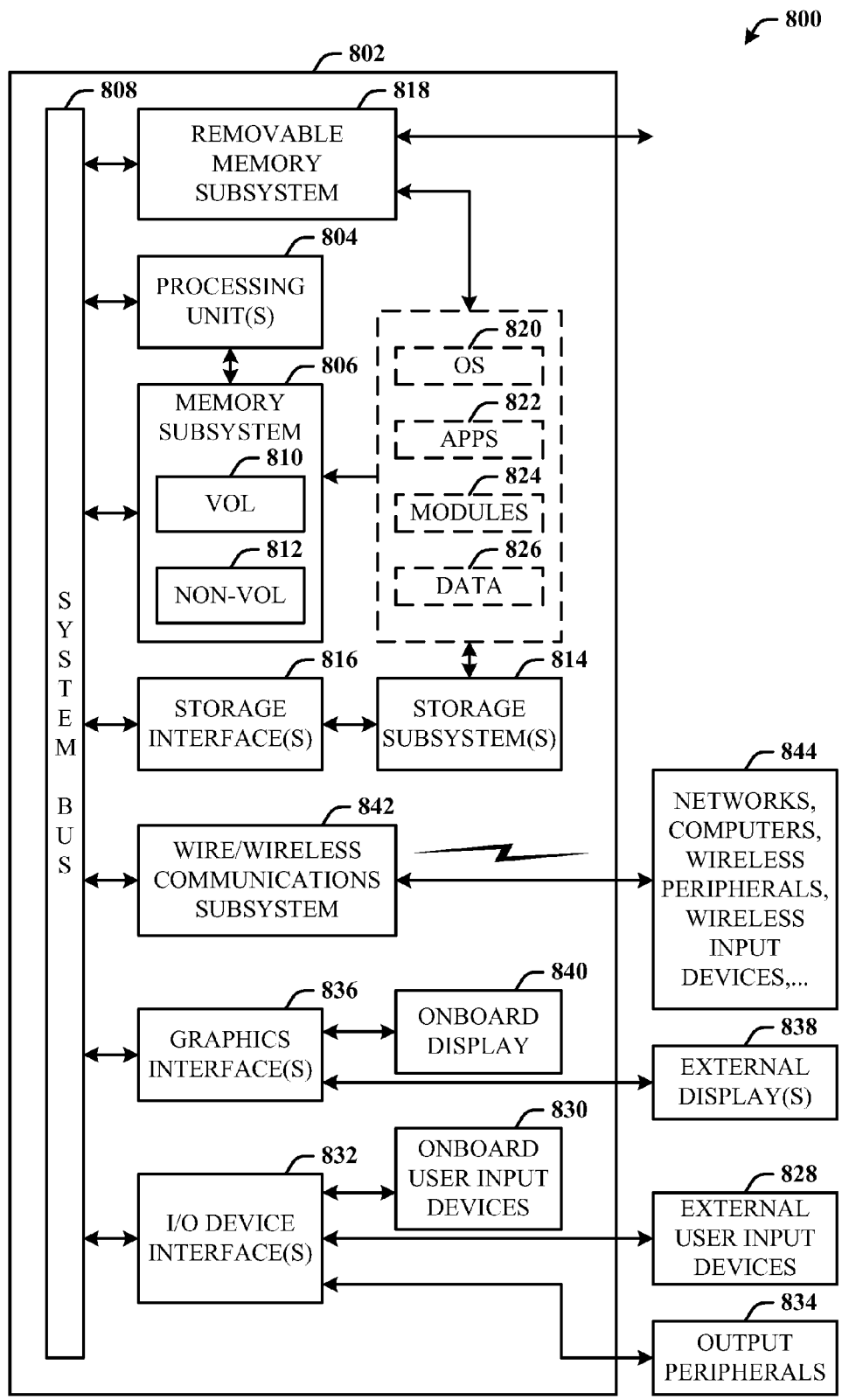
FIG. 8 illustrates a block diagram of a computing system operable as a server machine for tracking and dynamically suggesting information to a new user or inactive user in accordance with the disclosed architecture.

Referring now to FIG. 8, there is illustrated a block diagram of a computing system 800 operable as a server machine for tracking and dynamically suggesting media to a new user in accordance with the disclosed architecture. In order to provide additional context for various aspects thereof, FIG. 8 and the following discussion are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the memory subsystem 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a removable memory subsystem 818 (e.g., flash drive form factor technology), and/or the storage subsystem(s) 814, including an operating system 820, one or more application programs 822, other program modules 824, and program data 826.

The one or more application programs 822, other program modules 824, and program data 826 include server-based components such as the detection component 104, the session 106, website portal 108, session content 110, web-based application 112, tracking component 114, content component 116, new session content 118, analysis component 202, and security component 302, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile media, removable and non-removable media. For the computer 802, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP) using logical connections via a wire/wireless communications subsystem 842 to one or more networks and/or other computers. The other computers can include workstations, servers, routers, personal computers, microprocessor-based entertainment appliance, a peer device or other common network node, and typically include many or all of the elements described relative to the computer 802. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wire/wireless communication subsystem 842 (e.g., a network interface adapter, onboard transceiver subsystem, etc.) to communicate with wire/wireless networks, wire/wireless printers, wire/wireless input devices 844, and so on. The computer 802 can include a modem or has other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 9:
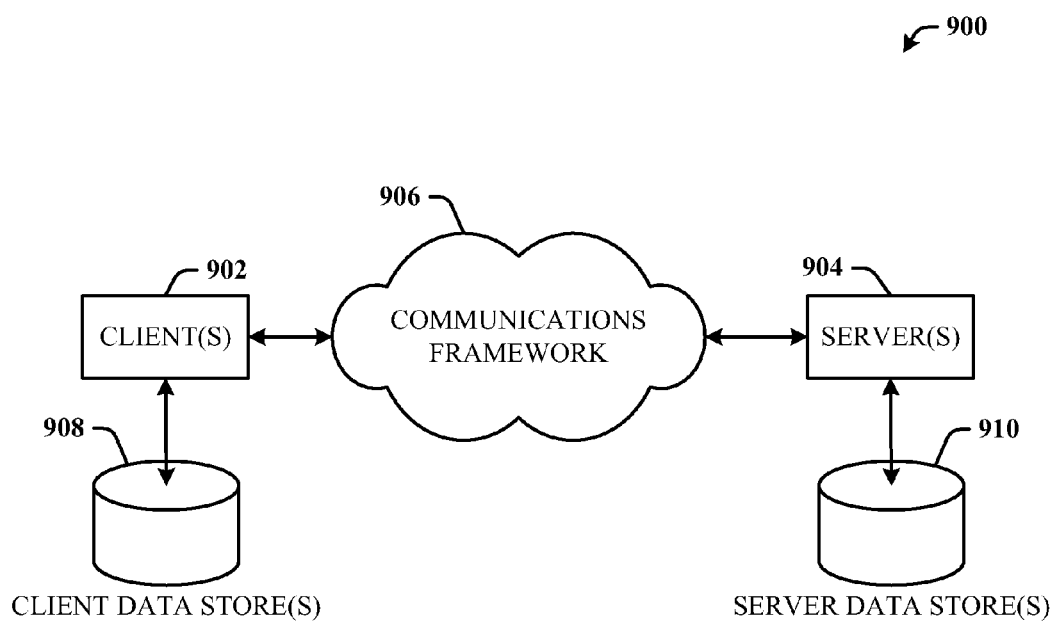
FIG. 9 illustrates a schematic block diagram of a computing environment for tracking and dynamically suggesting information to a new or inactive user in accordance with the disclosed architecture.

Referring now to FIG. 9, there is illustrated a schematic block diagram of a computing environment 900 for tracking and dynamically suggesting media to a new user in accordance with the disclosed architecture. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   memory that stores
      a detection component configured to detect a user in a session of a website portal, the session associated with session content,
      a tracking component configured to track interaction of the user with the session content, to produce tracking information,
      a content component configured to obtain and present new content targeted to the user after the user signs up for the website portal based at least on the tracked interaction of the user with the session content prior to the user signing up with the website portal, to convert the user into an active subscriber, and
      a security component configured to enable authorized and secure handling of user information that includes the tracking information and personal information, and to allow the subscriber to opt-in and opt-out of collection of the tracking information and any personal information obtained at signup, the authorized and secure handling of user information comprising ensuring that the user information is housed using security measures corresponding to sensitivity of the user information and restricting access to the user information to authorized viewers; and
   at least one processor that runs the detection component, the tracking component, the content component, and the security component.

2. The system of claim 1, wherein the website portal facilitates access to a web-based social application and the session content includes related entertainment application content and related social content.

3. The system of claim 1, wherein the website portal facilitates access to a web-based business application and the session content includes related business application services and related business application features.

4. The system of claim 1, wherein the content component surfaces step-by-step instructions based on interaction behavior of the subscriber to the session content.

5. The system of claim 1, wherein the memory further stores an analysis component configured to analyze subscriber browsing behavior, to extrapolate subscriber experience level based on the analysis, and to suggest new content for presentation.

6. The system of claim 5, wherein the content component submits new content as part of the session content based on the subscriber experience level.

7. The system of claim 1, wherein the content component suggests session content popular with other subscribers of the website portal based at least in part on an origin of the subscriber.

8. A system, comprising:
    memory that stores
        a detection component configured to detect a user in a member page of a website portal, the member page presenting content that includes a service,
        a tracking component configured to obtain tracking information of user browsing activity relative to the content and the service,
        an analysis component configured to analyze user browsing behavior on the member page and extrapolate user experience level based on the analysis,
        a content component configured to submit and present new content
    targeted to the user after the user signs up for the service based at least on the user experience level and user browsing behavior prior to the user signing up with the service to become a subscriber, and
        a security component configured to ensure secure collection, storage, and access to subscriber information that includes the tracking information and personal information, and allowing the subscriber to opt-in and opt-out of collection of the tracking information and any personal information obtained at signup, the security component configured to ensure that the subscriber information is housed using security measures corresponding to sensitivity of the subscriber information and restricting access to the subscriber information to authorized viewers; and
    at least one processor that runs the detection component, the tracking component, the analysis component, the content component, and the security component.

9. The system of claim 8, wherein the website portal facilitates access to a web-based social application and the session content includes related social application content and related social application features.

10. The system of claim 8, wherein the website portal facilitates access to a web-based business application and the content includes related business application services and related business application features.

11. The system of claim 8, wherein the content component presents step-by-step instructions of a feature based on the user experience level.

12. The system of claim 8, wherein the content component suggests content popular with other subscribers of the website portal based at least in part on an origin of the user.

13. The system of claim 8, wherein the analysis component further analyzes user browsing behavior prior to access to the website portal and the content component suggests and presents the new content based on the prior user browsing behavior and the user behavior relative to the content and the service.

14. A computer-implemented method of making suggestions to a user, comprising:
    detecting a user in a member page of a website portal, the member page presenting content that includes a service;
    tracking user browsing behavior relative to the content and the service to produce tracking information;
    analyzing the user browsing behavior and extrapolating user experience level based on the browsing behavior in the member page;
    suggesting and presenting new content targeted to the user after the user signs up for the service based at least on the user experience level and user browsing behavior prior to the user signing up with the service to become a subscriber;
    allowing the user to opt-in and opt-out of collection of tracking information and any personal information obtained at signup, user information for the user including the tracking information and the personal information; and
    enabling authorized and secure handling of the user information at least by ensuring that the user information is housed using security measures corresponding to sensitivity of the user information and restricting access to the user information to authorized viewers.

15. The method of claim 14, wherein the member page is associated with a web-based business application, and the content includes a service provided by the business application with which the user is unfamiliar.

16. The method of claim 14, further comprising detecting that the user is an inactive user based on reduced browsing activity in the member page.

17. The method of claim 14, further comprising dynamically changing the content based on a computed increase in experience with an existing service by the user.

18. The method of claim 14, further comprising up-selling and cross-selling features, services, and products to the subscriber based on the browsing behavior.

19. The method of claim 14, further comprising analyzing the browsing behavior based on duration of exposure to pieces of the content and click-through data.

20. The method of claim 14, wherein the member page is associated with a web-based social application, and the content includes a service provided by the social application with which the user is unfamiliar.

* * * * *